(No Model.)

C. N. DENNETT.
CARRIAGE.

No. 522,975. Patented July 17, 1894.

WITNESSES
J. M. Hartnett
E. A. Woodbury

INVENTOR
Charles N. Dennett
By his Atty
Henry W. Williams

UNITED STATES PATENT OFFICE.

CHARLES N. DENNETT, OF AMESBURY, MASSACHUSETTS.

CARRIAGE.

SPECIFICATION forming part of Letters Patent No. 522,975, dated July 17, 1894.

Application filed April 3, 1894. Serial No. 506,153. (No model.)

*To all whom it may concern:*

Be it known that I, CHARLES N. DENNETT, a citizen of the United States, residing at Amesbury, in the county of Essex and State of Massachusetts, have invented a new and useful Improvement in Carriages, of which the following is a specification.

This invention relates to that class of carriages which are provided with divided seats,—usually front seats,—i. e., seats which are divided longitudinally with the carriage-body into two seats; and particularly to those divided seats which are adapted to be swung up sidewise or toward the side of the carriage-body, to provide room for passage.

The nature of the invention is fully described below, and illustrated in the accompanying drawings, in which—

Figure 1:
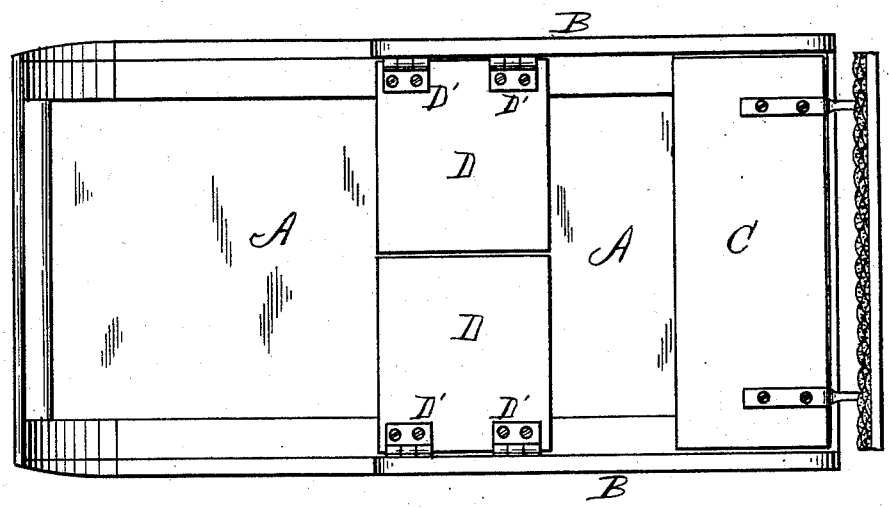
Figure 2:
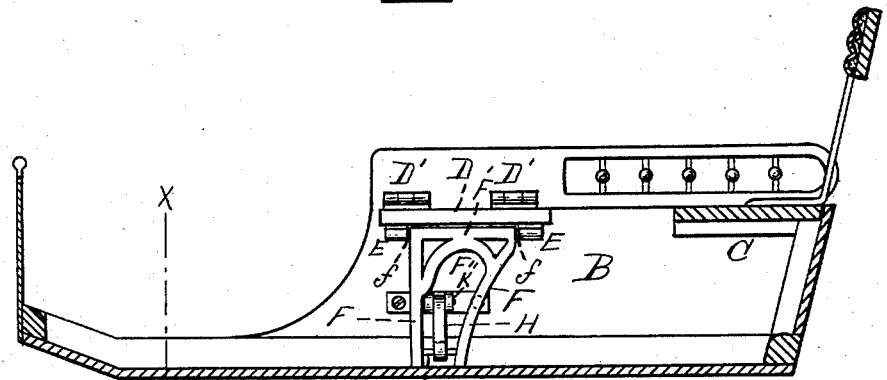
Figure 3:
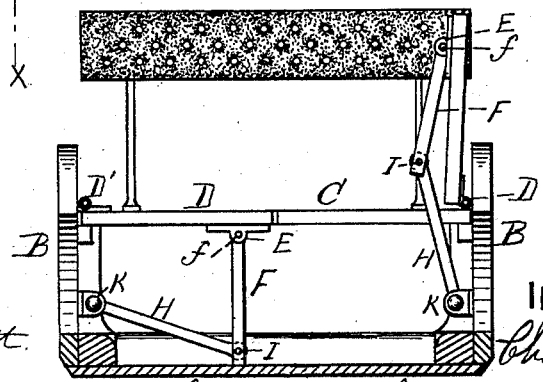

Figure 1 is a plan view of a carriage-body embodying my invention. Fig. 2 is a longitudinal vertical section of the same. Fig. 3 is a cross vertical section on line x, Fig. 2, one of the half seats being raised.

Similar letters of reference indicate corresponding parts.

A represents the floor, and B the sides of the carriage-body.

C is the rear seat, which may be constructed in any desired manner.

D D represent the two halves of the divided front seat, constructed exactly alike, and hinged at D' to the sides B. Each seat is provided on its under side, near the inner edge, with two loops or eyes E constituting bearings for the pintles or spindles f extending from a swinging frame—preferably metallic—which supports the seat when it is down. This frame consists of a pair of legs F, a cross piece F', a brace F'', and a small rod I which connects the legs near their lower ends. The details of the frame, however, may be varied provided it is made of suitable length to serve as a support for the half seat, be strong enough, and be provided with means for pivotal connection with the seat.

H is a link or rod pivotally secured to the frame by means of a perforation through which the rod I extends, and with its other end pivotally attached to a bracket K secured to the side B beneath the outer end of the half seat.

When passage is desired to the rear seat, one of the half seats D is lifted up into the position shown at the right side of Fig. 3, and after passage is had, it is lowered into its original position, in which it is supported by the frame or legs F. When the half seat is lifted, the link H keeps the frame F securely in position out of the way, and when it is dropping, the link or rod H guides the frame into a vertical position so that the half seat is level. Moreover, the link prevents the supporting frame from being moved out of place while it is supporting the half seat.

Having thus fully described my invention, what I claim, and desire to secure by Letters Patent, is—

1. A carriage seat pivotally secured to the body and provided with a support pivotally connected with said seat, and a link or rod connecting said support with the carriage-body, whereby the seat-support is held in position and guided during the swinging of the seat, substantially as set forth.

2. A carriage seat pivotally connected with the body, a swinging support for said seat pivotally secured at its upper end to the under side of the seat, and adapted to sustain the seat in a substantially horizontal position, and a connection secured at its opposite ends to the swinging support and the body, substantially as described.

3. In combination, a carriage seat pivotally connected with the body, the supporting frame or legs F pivotally secured at the upper end to the under side of the seat near the outer edge thereof, and the rod H pivotally secured at one end to the carriage body and at the other end to the supporting frame, substantially as set forth.

CHARLES N. DENNETT.

Witnesses:
SAMUEL W. NICHOLSON,
G. P. DENNETT.